United States Patent
Chirnomas et al.

(10) Patent No.: US 7,080,475 B2
(45) Date of Patent: Jul. 25, 2006

(54) METHOD AND APPARATUS FOR QUICK CHANGE DISPLAY GRAPHICS ON A MERCHANDISER

(76) Inventors: Munroe Chirnomas, 47 Skyline Dr., Morris Township, NJ (US) 07960; Raymond B. Leski, 1082 June Ct., Toms River, NJ (US) 08753

( * ) Notice: Subject to any disclaimer, the term of this patent is extended or adjusted under 35 U.S.C. 154(b) by 0 days.

(21) Appl. No.: 10/451,514

(22) PCT Filed: Dec. 21, 2001

(86) PCT No.: PCT/US01/51053

§ 371 (c)(1),
(2), (4) Date: Jun. 20, 2003

(87) PCT Pub. No.: WO02/074135

PCT Pub. Date: Sep. 26, 2002

(65) Prior Publication Data

US 2004/0128889 A1    Jul. 8, 2004

Related U.S. Application Data

(60) Provisional application No. 60/294,284, filed on May 29, 2001, provisional application No. 60/257,316, filed on Dec. 21, 2000.

(51) Int. Cl.
*G09F 7/02* (2006.01)
(52) U.S. Cl. ............... 40/611.06; 40/606.12; 40/574; 40/575
(58) Field of Classification Search ............. 40/611.06, 40/606.12, 564, 574, 575; 312/36, 42, 234.1, 312/234.2, 234.3
See application file for complete search history.

(56) References Cited

U.S. PATENT DOCUMENTS

| | | | | |
|---|---|---|---|---|
| 4,320,933 A | * | 3/1982 | Felix et al. ................. | 312/291 |
| 5,255,968 A | * | 10/1993 | Craven ....................... | 312/234 |
| 5,471,794 A | * | 12/1995 | Nishioka ..................... | 49/501 |
| 5,509,225 A | * | 4/1996 | Minh et al. ............... | 40/606.02 |
| 5,956,876 A | * | 9/1999 | Burdette et al. ......... | 40/606.02 |
| 6,195,924 B1 | * | 3/2001 | Rudick et al. ................ | 40/515 |
| 6,230,426 B1 | * | 5/2001 | Fakhoury et al. ........ | 40/606.02 |
| 6,499,242 B1 | * | 12/2002 | Rudick et al. ................ | 40/515 |

* cited by examiner

Primary Examiner—Gary C. Hoge
(74) Attorney, Agent, or Firm—Lawrence C. Edelman, Esq.

(57) ABSTRACT

A merchandiser includes a front door or wall portion which forms a barrier between an exterior side and an interior side of the merchandiser. The front door or wall portion holds a first display panel in a relatively fixed manner so that an exterior side of the first display panel forms at least a portion of the exterior side of the merchandiser. An access port (such as a slot) is included in the front door or wall portion, and is dimensioned and oriented so as to allow a replaceable graphics display panel to be passed, for example, from the interior side to the exterior side of the merchandiser, so as to be placed in juxtaposition with an interior facing side of the first display panel. In a preferred embodiment, the first display panel is affixed to the front door or wall portion in a manner so as to have an exterior facing convex shape, and said replaceable graphics display panel is placed in juxtaposition with the interior side of the first display panel by passing it through said access port from the interior side of said merchandiser, and pressed against the interior facing side of the first display panel by mechanical urging means which causes a press-fit of the replaceable display panel against the first display panel.

33 Claims, 7 Drawing Sheets

METHOD AND APPARATUS FOR QUICK CHANGE DISPLAY GRAPHICS ON A MERCHANDISER

CROSS-REFERENCE TO RELATED APPLICATIONS

This application claims the priority of U.S. Provisional Patent Application No. 60/257,316, filed Dec. 21, 2000, entitled METHOD AND APPARATUS FOR ARTICLE HANDLING, SUCH AS FOR A VENDING MACHINE, and U.S. Provisional Patent Application No. 60/294,284, filed May 29, 2001, entitled METHOD AND APPARATUS FOR QUICK CHANGE DISPLAY GRAPHICS ON A MERCHANDISER. The entire disclosures of these patent applications are incorporated herein by reference.

BACKGROUND OF THE INVENTION

1. Field Of The Invention

The present invention relates to a method and apparatus for providing quick change display graphics on, for example, a merchandiser, such as a vending machine.

2. Description of the Prior Art

Traditionally, graphics panels on the front doors of merchandisers are more or less permanently installed. If it were desired to change the graphics on these doors, it often took between 15 minutes to two hours to change one or more of the door mounted graphics panels. PCT patent publication WO 00/39780 describes a vending machine wherein interchangeable display sheets are stored on a spool assembly disposed at a top portion of the cabinet, wherein the display sheets are either manually or automatically lowered from the spool in order to appear as a new display face on the front of the vending machine. Although this technique allows rapid change of the graphics, one disadvantage is that the interchangeable sheets are pre-manufactured and stored in the machine, thereby not allowing for any modification of the selections that are available from the merchandiser. A further disadvantage is that no means are provided for modifying the selection numbers or the prices shown on the pre-manufactured sheets.

It is also generally known in the vending machine art, for example from the present inventor's prior PCT publication PCT/US00/21556 filed Aug. 7 2000 and entitled VENDING MACHINE, to provide a rigid auxiliary support frame in juxtaposition with the display face of a vending machine for carrying supplemental graphics cards having preprinted individual selections thereon. Corners (or edges) of the cards are inserted into slots (or rails) formed on the frame. The frame is then arranged in conjunction with the remainder of the display face of the vending machine so as to present to the customer the supplemental selections. Another type of carrier comprises a large clear selection "pushbutton" in which the preprinted individual selection cards can be placed, for being pressed by the user in order to make the article selection.

U.S. Pat. No. 6,023,870 issued Feb. 15, 2000 to Pepsico, Inc. describes a method and apparatus for changing the display graphics of a vending machine. The technique comprises the use of a flexible graphics sheet or sheets which are applied, alone or in combination with multiple flexible graphics sheets, to the reverse side of a display face of the vending machine using static cling (or in an alternative embodiment, using an adhesive). To change the display face, one must have a full and unobstructed access to the reverse side of the display face in order to properly clean and prepare the reverse side so that it can make a good static cling adhesion to the flexible graphics sheet(s), or to apply a chemical adhesive, as well as to actually apply the flexible graphics sheet or sheets.

It is noted that providing quick change graphics on the display face of a merchandiser is not a relatively simple task, especially if the goal is that the quick change graphics, in one act, change a substantial portion (such as greater than 15 percent) of the display face graphics of the merchandiser. This is because one issue typically important to manufacturers of merchandisers, such as vending machines, is that the structural integrity of the front door or wall portion of the merchandiser upon which the display face graphics are mounted, should not be sacrificed. Another issue of equal importance is that the security/vandal protection provided by the front door or wall portion of the merchandiser upon which the display face is mounted should also not be sacrificed.

Some of the disadvantages of these prior art display face changing techniques are that they are prone to erroneous setup, don't facilitate control over changes in the selections and are time-consuming, and in some cases complicated, to install.

SUMMARY OF THE INVENTION

It would be desirable to provide a method and apparatus that can more simply, quickly, reliably and in a visually pleasing manner, provide for a controlled change in presentation of selections at a merchandiser.

Accordingly, it is an object of the present invention to provide for:

quick change graphics,
for changing a substantial portion (such as greater than 15 percent) of the display face of the merchandiser (wherein the display face may or may not be lit from behind, i.e. and therefore be either transparent, translucent or opaque),
while maintaining security for the merchandiser (i.e. preventing unauthorized access to its interior), and
while maintaining the structural integrity of the front door or wall portion of the merchandiser upon which the display face graphics are mounted.

Challenges to meeting the above objectives comprise obstructions which prevent access to the interior side of the display face, such as:

light bulbs, their fixtures and associated wiring, etc.,
beams which provide for structure in the front door or wall portion of the merchandiser upon which the display face graphics are mounted,
structures related to the customer retrieval area which is typically mounted in the front door or wall portion of the merchandiser upon which the display face graphics are mounted, and
security panels which provide security (i.e. prevent unauthorized access), and are typically positioned orthogonal to the front door or wall portion upon which the display face graphics are mounted, and located between the display face graphics area and a portion of the cabinet (typically the front door) upon which the user interface components are housed.

In accordance with one aspect of the present invention, a merchandiser includes a front door or wall portion which forms a barrier between an exterior side and an interior side of the merchandiser. The front door or wall portion holds a first display panel in a relatively fixed manner so that an exterior side of the first display panel forms at least a portion of the exterior side of the merchandiser. An access port (such as a slot) is included in the front door or wall portion and is dimensioned and oriented so as to allow a replaceable graphics display panel to be passed, for example, from the interior side to the exterior side of the front door or wall portion, so as to be placed in juxtaposition with an interior facing side of the first display panel. In a preferred embodiment, the first display panel is affixed to the front door or wall portion in a manner so as to have an exterior facing convex shape (although other shapes are possible without departing from the teachings of the invention), and the replaceable graphics display panel is placed in juxtaposition with the interior side of the first display panel by passing it through said access port from, for example, the interior side of said front door or wall portion, and being pressed against the interior facing side of the first display panel by mechanical urging means which causes a press-fit of the replaceable display panel against the first display panel.

In accordance with a further aspect of the invention, the first display panel includes a substantially clear area thereon for being aligned with at least certain portions of the replaceable graphics display panel, the certain portions of the replaceable graphics display panel including graphics indicative of selectable items available from the merchandiser.

In accordance with an even further aspect of the invention, the replaceable graphics display panel comprises at least two sheets, i.e., a holder sheet for holding replaceable graphics thereon indicative of said selectable items, and a tension sheet for providing a press-fit of said holder sheet to the interior facing side of the first display panel. In a further embodiment, the replaceable graphics display panel may comprises three sheets, the first two sheets being similar to those noted above, and the third sheet, being a new first sheet which cooperates with the tension sheet to sandwiched the holder sheet therebetween.

In accordance with a still further aspect of the invention. the urging means comprises a stop for engaging the replaceable graphics display panel along one side thereof, and a spring means, e.g., leaf or compression spring, for engaging an opposed side of the replaceable graphics display panel, for forcing the replaceable graphics display panel into a tension (i.e., "snap") fit against the interior facing side of the first display panel.

In accordance with an even further aspect of the invention, a "lever/shoehorn" mechanism is provided to aid engagement/disengagement of the replaceable graphics display panel with the urging means.

Other portions or structures forming or mounted to the front door or wall portion of the merchandiser are positioned so as to not present a permanent (or not easily removable obstruction which would prevent the replaceable graphics display panel from being inserted into the access port and positioned in juxtaposition with the first display panel. For example, in the illustrated preferred embodiment of the present invention, slots are provided in a door portion of said merchandiser cabinet for the positioning of light bulbs which are used for backlighting the display face. By mounting the bulbs in the slots, the bulbs do not present an obstruction to the placement of the replaceable graphics panel in juxtaposition with the first display panel. For maintaining security and structural integrity of the merchandiser cabinet, covers can be mounted over the light bulb slots on the inside surface of the front door, as well as a lockable cover over the access port used for inserting the replaceable graphics display panel. In an embodiment of the invention wherein the front door of the merchandiser includes along one end a user interface, and therefore may have a security panel orthogonal to the face of the front door, which would normally present an obstacle to insertion of the replaceable graphics display panel in juxtaposition with the first display panel in accordance with the invention, the security panel will have one or more access port's (i.e. slots) formed therein so as to be aligned with the first noted access port. Alternatively, the security panel and associated user interface can be mounted on the front door or wall portion of the merchandiser which includes the display face graphics so as to be positioned between the center of the door/wall portion and an edge of the door/wall portion in which said access port is formed, so as to not obstruct insertion and placement of the replaceable graphics panel in juxtaposition with the first display panel. Additionally, the security door can be mounted to the cabinet so as to be out of the way of the slot.

In accordance with further aspects of the invention, these objects are fulfilled by providing a method of displaying interchangeable/supplemental graphics on a display face of, for example, a merchandising cabinet, comprising the steps of:

mounting on an exterior side of the merchandising cabinet in a substantially permanent manner, a first display panel for forming an exterior portion of said display face, at least a portion of said first display panel being clear, providing a replaceable second display panel which, in one embodiment, includes replaceable display graphics positioned thereon that are representative of articles stored in said merchandiser, said second display panel being relatively flexible and dimensioned so as to align with and combine in a graphically unified manner with the clear portion of said first display panel for providing an interchangeable/supplemental graphics portion of the display face.

In accordance with a further aspect of the invention, the first panel, including first and second display portions thereon, comprises a major portion of the display face of the merchandising cabinet, the first display portion having pre-printed graphics and the second portion being substantially transparent.

In accordance with a further aspect of the invention, when the first and second display panels are aligned, graphics on said first and second panels combine to provide an apparently unitary display presentation to potential users of the merchandiser.

In accordance with a further aspect of the invention the second display panel also includes pre-printed graphics thereon which combines with pre-printed graphics of the first display panel, to provide said apparently unitary display presentation.

In accordance with a further aspect of the invention, the merchandiser includes a cabinet defining an enclosure including in its interior an article storage area and a dispensing arrangement. A display portion of the cabinet includes a graphics introducing slot therein adjacent an edge thereof. The slot has a length dimensioned for passing therethrough, from the interior side of the display portion to an exterior side of the display portion, the second panel having the replaceable graphics.

In accordance with a further aspect of the invention, display portion includes means for releaseably securing the replaceable second display panel on the exterior of the front wall.

In accordance with a further aspect of the invention, the means for releaseably securing includes a holder for engaging opposed edges of the replaceable second panel and providing a force to the edges so as to urge the replaceable second panel into a semipermanent position against an interior facing side of the first display panel.

In accordance with a further aspect of the invention, the holder is arranged along he slot and accessible on the interior side of the front wall.

It is noted that the slot in the otherwise substantially solid door is designed to operate in conjunction with the replaceable second panel for facilitating security in the merchandiser from unauthorized access/vandalism, while at the same time providing access for quickly changing the display face graphics.

In this regard, it is noted that a locking cover plate can be used to limit access to the graphics introducing slot to only authorized persons, such as the owner of the merchandiser (or a supplier of the articles stored in the merchandiser), as compared to the service ("route" person who refills the merchandiser. In the event that a locking cover is used to prevent access to the slot, in a further embodiment of the invention, the graphics introducing slot and its locking cover could be accessible from the exterior of said merchandiser. This would permit an authorized person to change the display face graphics independently of the routine servicing from outside the merchandiser.

In accordance with the principles of the present invention the slot can accommodate a variety of graphics sheets. For example, a one piece sheet (with or without provisions for replaceable cards), an assembly of multiple sheets (as in the to be described preferred embodiment) and even pockets on a sheet (where, for example, the pockets could be mounted on the rear of a front sheet printed with graphics and clear windows.

In accordance with one aspect of the invention, in a preferred embodiment the replaceable graphics display panel comprises three aligned sheets sandwiched together to form a single replaceable graphic assembly, and includes front "mask" sheet, a middle graphic card "holding" sheet, and rear "tension/support" sheet. The middle holding sheet includes means for holding replaceable graphics display cards representative of individual stored articles which are vendible by the merchandiser.

The front sheet acts as a protective cover over the cards and may include preprinting thereon, such as for forming a printed frame for aesthetic purposes around the cards, as well as other graphics of a general mature, such as "branding" or advertising type graphics. Additionally, the preprinting of the first sheet can also included the selection number or price information thereon. Alternatively, the cards themselves can also have slots or pockets within them for attaching price or selection tags thereto.

The rear sheet is clear and serves to protect the cards held on the middle sheet from shifting position when the front, middle and rear sheets are combined so as to form a single assembly. The combining of the sheets can be by adhesion, bonding or fastening, using for example glue, rivets, clamps or staples. The three sheets may have holes appropriately punched within them to facilitate the combining of the sheets into a single assembly.

In the preferred embodiment, the middle sheet includes slots appropriately positioned so as to hold the cards. In this arrangement, the front sheet acts to protect the cards from falling out after they are placed into their predetermined slots in the middle sheet, and in fact, any preprinted graphics on the front or back sheets, could all be placed on the single sheet with holds the replaceable graphics cards, i.e., the "holder " sheet.

In a further embodiment, the sheet with replaceable graphics cards could be mounted to one sheet without the benefits of a front or a back sheet.

Since in the preferred embodiment the cards are held in the middle sheet by slots which engage their corners, thereby allowing the corners of the cards to protrude through the back of the middle sheet, the rear sheet provides protection to the cards mounted on the middle sheet, so that the corners of the cards will not get knocked out of the middle sheet when the middle sheet is passed through the graphics introducing slot. Additionally, the rear sheet further acts as a tensioning support structure, in particular when used in on a display face designed as a tensioned arc, i.e., a bubble front graphic design.

In accordance with further features of the invention, the middle sheet (or the cards held therein) can include a further arrangement, such as additional slots, for mounting price tags and/or selection number tags in a manner so that they are associated with each of the cards. In this way, the assembly comprising the replaceable graphics display can be prepare at a location remote from the merchandiser, such as by an owner of the merchandiser and his factory or a supplier of the products stored in the merchandiser at his warehouse. This method and apparatus not only reduces the onsite labor, effort and time to service the merchandiser, but also gives a degree of control to the article manufacturer or merchandise owner over the selections/prices displayed for the articles stored in the merchandiser.

In accordance with one aspect of the invention, the thickness and flexibility of the middle and rear sheets are determined so that the rear sheet would give tension and structure to the middle sheet.

In a further embodiment, other means can be used to hold the cards at predetermined positions on the middle sheet. For example instead of "corner" slots, the cards could be notched or have "outboard tabs" at a point along their length or width, whereby the notches/tabs provide specific capture points for engaging card length slots in the middle sheet. One of the benefits of using corner captures as compared to outboard notches/tabs on the card, is that the cards can be mass produced using slit or shear production techniques, whereas a notch/tab would need to be die cut and notched, thereby wasting material and necessitating a more complicated manufacturing process.

It is noted that in accordance with a further aspect of the present invention, it is possible to use the above noted technique to change the appearance of an entire graphical display face (i.e., not just a portion thereof). In this case the bubble front display face (first display panel) would be entirely clear or include at least two major portions thereon which are clear, such as one above and one below the customer product retrieval area. In this case, a corresponding number of replaceable second panels would be provided, one for each clear area in the display face. For forming the replaceable second panels, the above noted preferred assembly of three sheets, or even a single sheet having the replaceable graphics cards position thereon, could be used. In another aspect of the invention, one easily removable graphics sheet can be placed behind the entire front clear surface. This design would require a specially designed customer retrieval box area so as to not interfere with the replaceable sheet. Another way to accomplish this is to move the customer box beyond the area of the front clear structural sheet (e.g., under the customer interface area).

In accordance with and even further aspect of the invention, it is noted that one or two additional areas on the front display face are also easily replaceable; those which are adjacent and to the sides of the customer product retrieval area This embodiment of the invention may require a second graphics introducing slot on a side of the customer retrieval area which is opposite the side having the first noted graphics introducing slot. In this embodiment there is the potential to provide up to four panels of the second type, wherein the graphics used on the replaceable panels of the second type can have complimentary graphics forming a unified image or picture with the graphics on the first panel forming a display face. Alternatively, the graphics used on the replaceable panels can be used, for example, to provide for three or four discrete image areas (a top area, two middle areas, and a bottom area), or one where the middle two areas could also be treated as two separate image components.

It is noted that the entire exterior of the display face may comprise a single clear sheet of polycarbonate material. One other embodiment of the invention would be utilizing a fully clear front piece of material, such as polycarbonate on the front of the machine and enable the machine to have a security door behind it which can be hinged and allow the machine operator to change the graphics and use the door as the slot.

In accordance with a further feature of the present invention, the product retrieval door of the merchandiser can have an image on it, and if desired that image can be such that it complements the image with panels adjacent to it, and thereby appears to provide a unified/continuous image as the display face. Additionally, the customer retrieval door can be made of a transparent material which can have mounted thereto a back-lit graphic which enables the image on the retrieval door to appear lit. The light used to illuminate the retrieval door graphic can be supplied by cutouts positioned in the article disposal chute positioned inside the merchandiser. For additional security reasons, the cutouts in the disposal chute should be covered by a light transmissive material having a secure structural integrity, such as polycarbonate.

Although in the present invention the slot is provided in an access/security door, the invention does not require such a door and the slot of the present invention could be provided in a frame portion, while a second door, for example which provides thermal insulation for a refrigerated storage area, could comprise a security/access door.

The above described arrangement, comprising the graphics introducing slot in combination with the first and second graphic display panels, and also the preferred embodiment for the multiple sheet assembly which forms the second graphic display panel, each present a particularly advantageous method for controlling changes which represent discrete selections to the display face of a merchandiser so that they are only made by authorized personnel. As noted above, of particular advantage is the fact that the single replaceable graphic assembly can be prepared/assembled at a location remote from the merchandiser, whereby the replaceable graphic cards can be changed, as well as the associated price tags and selection tags for each graphic illustration of the selection and the relative position on the display face of each graphic card. Furthermore, the preferred embodiment where the replaceable graphics display panel comprises three aligned sheets sandwich together to form a single replaceable graphic assembly is particularly advantageous because substantially all of the replaceable graphics panels can be made of low-cost plastic, and can be assembled at the remote location without the use of fasteners (by using, e.g., the forenoted press fit techniques), thereby not requiring any tools and facilitating a low-cost assembly.

DETAILED DESCRIPTION OF PREFERRED EMBODIMENTS OF THE INVENTION

Figure 1:
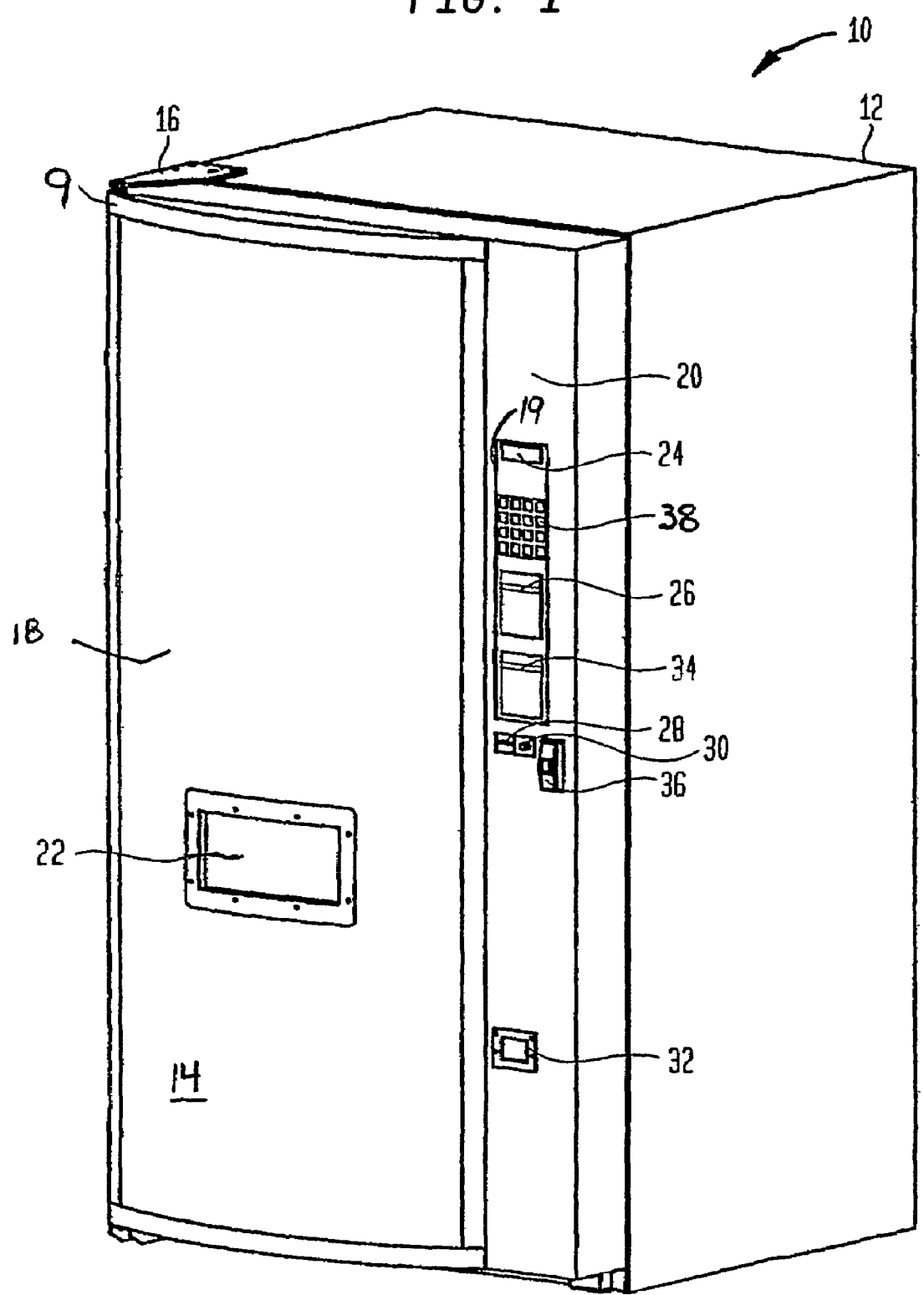
FIG. 1 is a front perspective view of a vending machine constructed and operating in accordance with the principles of the invention.

FIG. 1 illustrates an environment for the invention described herein, in the form of an article merchandiser, such as a point-of-sale (POS) article dispenser. Although throughout the following description, reference is made to implementation of the invention in a vending machine environment, it is intended that the term "vending machine", and in fact the environment for the present invention, include more general purpose article merchandising, handling, retrieval and/or dispensing apparatus, as well as POS equipment. Such equipment, if embodied as a portable device may comprise and be about the size of a traditional vending machine or as large as a tractor-pulled trailer, and if embodied as a non-portable device may comprise an automated dispensing room or an area located in a permanent structure, such as in a building (with or without interior walls and in some embodiments without an enclosing cabinet). Furthermore, it is intended that the term "articles" or "products" include in at least some of the embodiments of the invention described herein, not only goods, but also services and/or information, in either a permanent or temporal form. It is also noted that throughout the following description similar reference numerals used in the subsequent FIGURES are intended to refer to the same feature, element or part previously described.

Accordingly, FIG. 1 illustrates a perspective view of a vending machine 10, comprising one embodiment for an apparatus that is constructed and operates according to the present invention. Vending machine 10 includes a main cabinet 12 and a front door 14 mounted on a hinge 16 for providing access to the interior of the vending machine for servicing (refilling it with articles, maintenance, etc.). Note, in a further vending machine embodiment, a service door or access port to the interior of cabinet 12 could be positioned anywhere on or as a part of cabinet 12. In FIG. 1, front door 14 is shown in a closed position, forming an enclosure with main cabinet 12, the interior of which various components of vending machine 10 are housed, as explained in more detail below.

Front door 14 includes a convex-shaped display face panel 18 (commonly referred to as a "bubble" front); adjacent a flat section 20, however, these particular shapes are not necessary for the invention. For example, convex shaped display face panel 18 could be flat. Display face panel 18 is attached to the front of door 14 via a perimeter frame 9 of conventional design. In the illustrated embodiment the display face panel 18 is back-lit using fluorescent bulbs, not shown, to enhance the visibility of its graphics, and may therefore comprises a translucent plastic base material, such as LEXAN® or similar polycarbonate, having a thickness of, for example 0.115 inches. Display panel 18 typically has brand name and/or logo graphics pre-printed or screened on an interior facing side thereof, and may even include graphics which illustrate the individual articles that are vendible by vending machine 10, as well as the price and/or selection information for the articles. The present invention is directed to improvements relating to the display portion of the vending machine, and more specifically to various features which facilitate a simple and reliable technique for customizing/changing the graphics on the display face as well as a method for controlling changes to the graphics on the display face, as will be described in greater detail later on. Accordingly, first the structure and basic operation of the vending machine embodiment/environment for the present invention will be described.

A customer retrieval area 22 is formed in the panel 18 on door 14 so that articles stored therein can be discharged to a user of vending machine 10. In a further embodiment, area 22 can be formed on flat section 20, or another wall of cabinet 12.

Various user interface components are mounted on flat section 20 of door 14. A customer display 24 may be a conventional fluorescent or LED display panel for displaying various items of information to a user of machine 10, such as feedback to the user of the selection made, the amount tended, and if the product is sold out or being vended. For accepting payments, a bill acceptor slot 26 accepts paper money into a conventional bill acceptor mechanism (mounted inside machine 10 so as to have its user interface portion extend through an opening 19 in flat section 20) for purchasing articles or for making change. A coin insertion slot 28 accepts coins into a conventional coin changer (also mounted inside machine 10 so as to have its user interface portion extend through opening 19) for purchasing articles or for making change. A coin return actuator 30 comprises a conventional push-button mechanism for activating a coin return portion of the coin changer mechanism which, upon actuation returns coins inserted by the current user, to a coin return well 32. The coin return portion of the coin changer mechanism also provides change to the coin return well 32 either in response to the purchasing of articles or for making change for paper money or larger coins. A credit/debit card slot 34 accepts a plastic credit/debit card inserted into a conventional card reader mechanism (also mounted inside machine 10 so as to have its user interface portion extend through opening 19) for allowing a user to pay for purchases via credit/debit cards. A door handle/lock mechanism 36 enables front door 14 to be secured so that it cannot be opened without a key. For allowing user selections, display panel 18 may include graphics, as noted above, which indicates the various articles vendible by the machine, as well as their associated price and a unique selection number. A conventional keypad push-button mechanism 38 is provided for enabling a user to select a desired article from vending machine 10. Alternatively, push-button mechanism 38 could include an individual push button for each article selection, as well known. In a further embodiment a user operated touch screen could replace pushbutton mechanism 38 and display 24. Although not shown in FIG. 1, machine 10 also includes a conventional telecommunications component that can be used for authenticating credit card purchases, as well as other uses relating to machine control and reporting the inventory and operational status of machine 10 to a remote location, as well known to those of ordinary skill in this technology. Although vending machine 10 is illustrated to include the above described user interface components, in a more minimal embodiment of the invention, most, if not all, of these user interface components could be omitted, and the dispenser could in fact be controlled from a remote location, with or without a local payment system.

Figure 2:
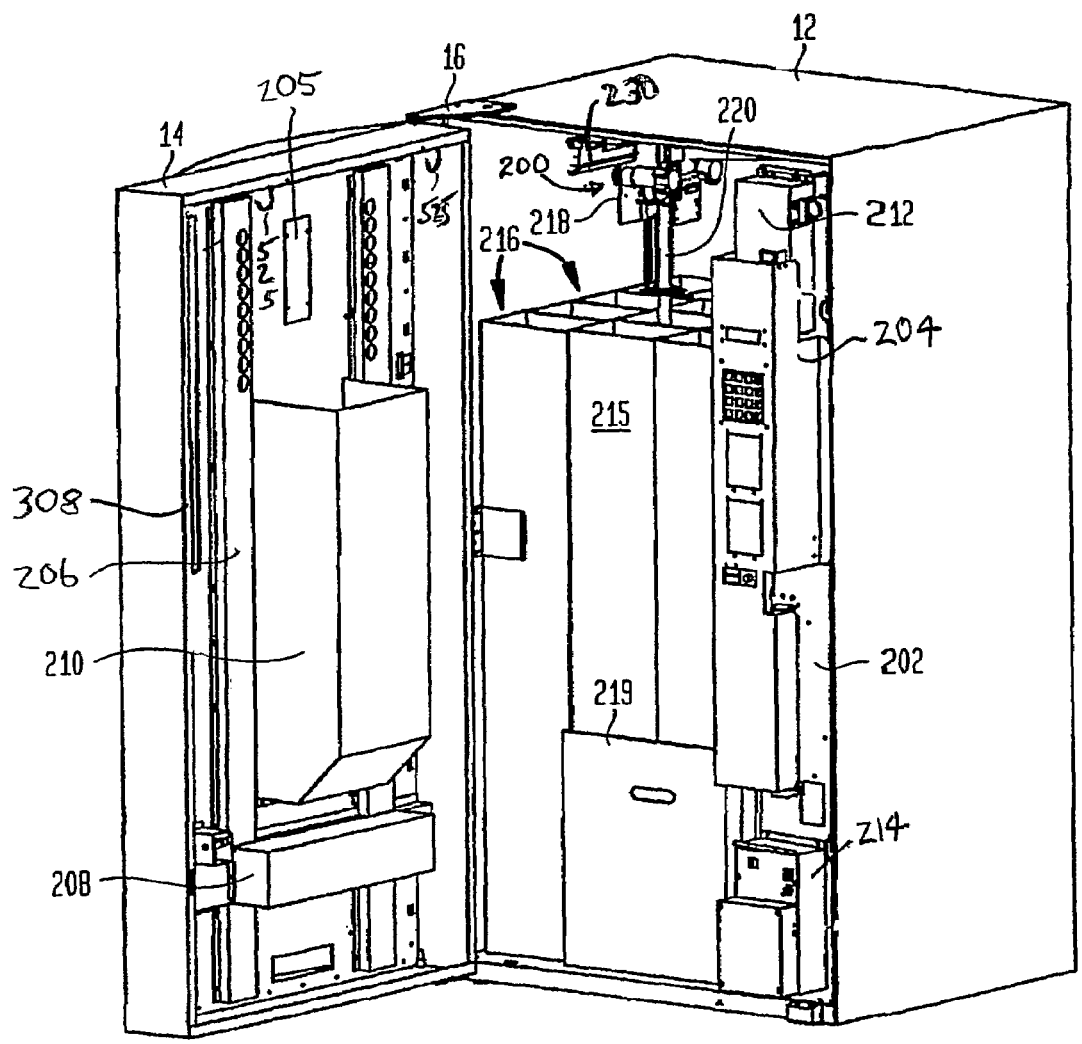
FIG. 2 is a front perspective view of the vending machine of FIG. 1, with the front door opened, so as to illustrate the main mechanical and electrical components therein.
Figure 3:
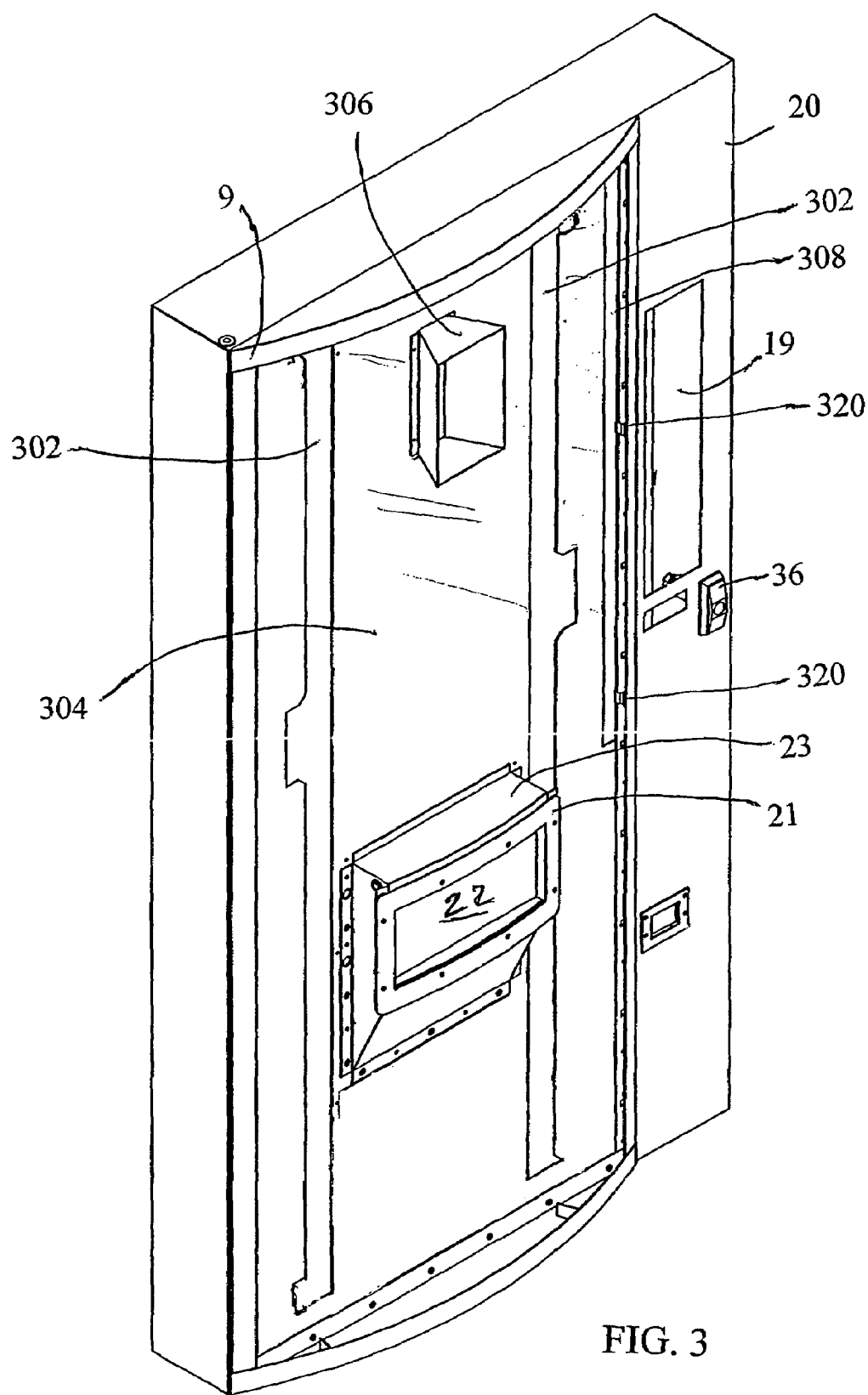
FIG. 3 illustrates a front view of the door of the vending machine of FIG. 1 having its display face removed, which is constructed and operates in accordance with the principles of the invention.

In the following description, refer simultaneously to FIGS. 2 and 3, where FIG. 2 is front perspective view of the vending machine of FIG. 1, with the front door 14 open, so as to illustrate the main mechanical and electrical components therein, and FIG. 3 is a view of the exterior of the front door 14 constructed in accordance with the principles of the invention, and having its display face panel 18 removed.

As shown in FIG. 2, the right portion of the front of cabinet 12 includes a vertically mounted support panel 202, which is used for mounting most of the user interface components. A hinged mounting bracket 204 is mounted on panel 202 and aligned with an opening in door 14 so that the user interface components, such as the selection button keypad 38, coin insertion slot 30, bill acceptor slot 28, coin return 32, and customer display 24, are all accessible to the user from the front side of door 14. Mounted on the interior of front door 14 are two fluorescent bulb light sources (not shown) that emit light for backlighting panel 18. The fluorescent bulb light sources are behind protective covers 206 so as to provide security (vandal protection), which is desirable as a result of the slot openings (shown as 302 in FIG. 3) in the structure of door 14 which allow for insertion of the fluorescent bulbs. Also mounted on the interior of front door 14 is a ballast 208 for supplying power to the fluorescent bulbs, and a product delivery chute 210 . . . Note, the product delivery chute 210 is unconventional in that it is extremely tall, and therefore serves as a security measure to help prevent unauthorized access into the machine by insertion of an arm or other grasping mechanism into the customer retrieval area 22 from the exterior side of the machine. In typical prior art vending machines, a swinging security door is usually found at the top of chute 210, which swings into in a vandal blocking position when the customer pushes in the swinging door at the entrance to the product retrieval area 22 In a further embodiment of vending machine 10, such a swinging security door could be used in conjunction with product delivery chute 210, especially if chute 210 is not as tall as the one illustrated in FIG. 2 and also if the product retrieval area 22 is located higher up on machine 10. Mounted behind hinged mounting bracket 204 is a conventional bill acceptor mechanism for causing paper money inserted into bill acceptor slot 28 to be drawn into vending machine 10, a conventional coin changer which accepts coins inserted into coin insertion slot 28 and supplies coins to coin return well 32, a magnetic card reader, and a conventional bill validator which ascertains proper insertion of paper money into bill acceptor slot 28.

The interior of cabinet 12 substantially comprises a storage area 215, wherein a plurality of a vertically aligned bins 216 having open tops, store therein stacks of articles to be vended. Although in the illustrated embodiment a robotic article dispenser comprising a suction gripper (not shown) at the free end of a suction hose 220 is used to dispense the stored articles, such type of mechanism is not required for the present invention, and in fact any type of dispensing mechanism could be used. In the illustrated robotic dispenser, a hose positioning mechanism is coupled to the suction hose 220, and comprises: a carriage 218 which includes a driven "pinch roller" aligned for driving hose 220 in the vertical (Z) direction, a beam 230 from which carriage 218 is slidably suspended and adapted for motorized movement there along (in the front/back "Y" direction); and a slider arrangement (not shown) mounted in the left/right "X" direction at the top underside of cabinet 12, to which beam 230 is slidably suspended therefrom and adapted for motorized movement there along. In the operation, a blower motor (not shown) provides suction to said hose 220, and the hose positioning mechanism controllably positions hose 220 to enter a selected bin 216, contact and become secured to an article at the top of the stacked in the bin, remove the selected article and position the article in the delivery chute 210. As noted above, although a robotic dispenser is described herein, it will be clear that the principles of the invention are not particular to any type of dispenser nor its dispensing arrangement and thus a gravity feed or spiral wire dispenser, to name just two types of dispensing arrangements, could alternatively be used.

A control board 212 is mounted on panel 202 and comprises a printed circuit board on which circuitry is formed and to which integrated circuit chips are attached. A power supply 214 is also mounted on panel 202 and supplies power for the electrical components of vending machine 10. Control board 212 includes a microprocessor that is electrically connected to various sensors, hose positioning motors, the above described user interface elements, as well as other devices within vending machine 10, to control the operation of vending machine for dispensing articles, in a manner that is well known to those of ordinary skill in this technology. Accordingly, further description of the construction and operation of the remainder of the vending machine is believed to not be necessary.

It is noted that FIGS. 1 and 2, 3 illustrate the exterior and interior sides, respectively, of the front door of a vending machine constructed in accordance with several aspects of the present invention, which are improvements over structure found in prior art vending machines. In a preferred embodiment, door 14 is constructed of a sturdy material 304, such as sheet steel, which has appropriate bends made therein so as to form the shape of door 14 as shown in FIG. 3. Note, door 14, has several openings formed therein, and the display frame 9 attached thereto. Door 14 is particularly advantageous in that it:

provides for security and vandalism prevention, while at the same time, maintains its structural integrity in spite of having: fluorescent bulb openings 302, an opening 306 for a viewing window (which allows a user of vending machine to see the "workings" of the robotic dispenser during its operation), an opening for the customer retrieval area 22, as well as the forenoted opening 19 for the user selection controls and payment mechanism.

In accordance with the principles of the present invention, a further opening is provided in door 14, namely a display face change slot or access port 308. As will be described in greater detail later, slot 308 is used for juxtaposing a replaceable graphics display panel with the interior facing side of display face panel 18, enabling quick change graphics in accordance with one aspect of the present invention.

Figure 6B:
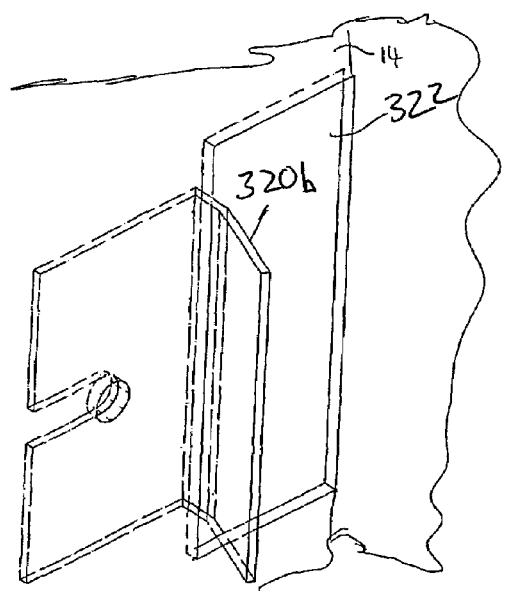
FIGS. 6a and 6c illustrate details of urging means, i.e., the spring tabs, shown in FIG. 3.
Figure 6A:
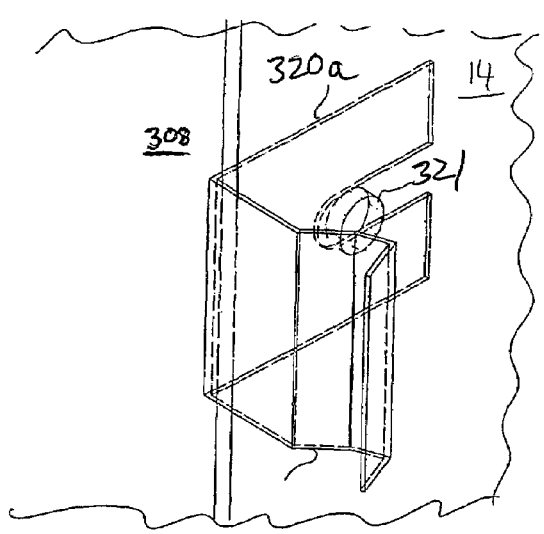

Additionally, spring clips 320 (which may simply comprise small sheets or tabs formed out of spring steel), are positioned in a spaced manner adjacent slot 308, and a corresponding set of spring clips 320 are positioned along a portion of frame 9 which is opposed thereto. FIGS. 6a and 6b illustrate close-up views of spring clips 320a positioned along slot 308, and the spring clips 320b positioned in an opposed manner thereto, respectively. Clips 320a are passed through slot 308 and affixed to door 14 via a screw head 321. Spring clips 320b are affixed in a similar manner to the opposite side of door 14 using small openings 322 formed in door 14 for this purpose. Together, the opposed sets of spring clips 320 function as a "tensioning/urging means" to hold the replaceable graphics display panel in the forenoted juxtaposition with the display panel 18. A top portion 23 of customer retrieval area 22 provides a convenient support area for the replaceable graphics display panel. Further details of the construction and operation of the replaceable graphics display panel will be described in detail later. A frame 21 provides a mounting support for an outside frame portion, not shown, which forms a boarder around the customer retrieval area 22 and also secures bubble front 18 to door 14 at the customer retrieval area 22.

Since bulb slots 302 extend across a substantial portion of the length of door 14, C-shaped covers 206 are adapted to be secured to said door on the interior surface thereof to substantially cover slots 302. Covers 206 add vandal proofing/security for the contents of machine (both the articles stored therein, as well as the electronic and mechanical parts and accumulation of payments received therein) while at the same time providing structural integrity to the door to compensate for weakness caused by slots 302. Additionally, the covers 206 can have holes cut therein so that the light from the bulbs can illuminate the interior of the vending machine, and thereby allow customer entertainment by viewing the operation of the robotic dispenser through a viewing window 205. It is noted that a "funnel shaped" support frame 306 can be attached to the outside facing portion of the front door and aligned with window 205, which can be used to help support panel 18 on door 14. Furthermore, the "entertainment" feature of window 205 could be enhanced by placing LED's or other lights, blinking or constant, on the side walls of funnel "shaped" frame 306. Such lights could also be used as an attention attraction device to attract potential customers.

Figure 4A:
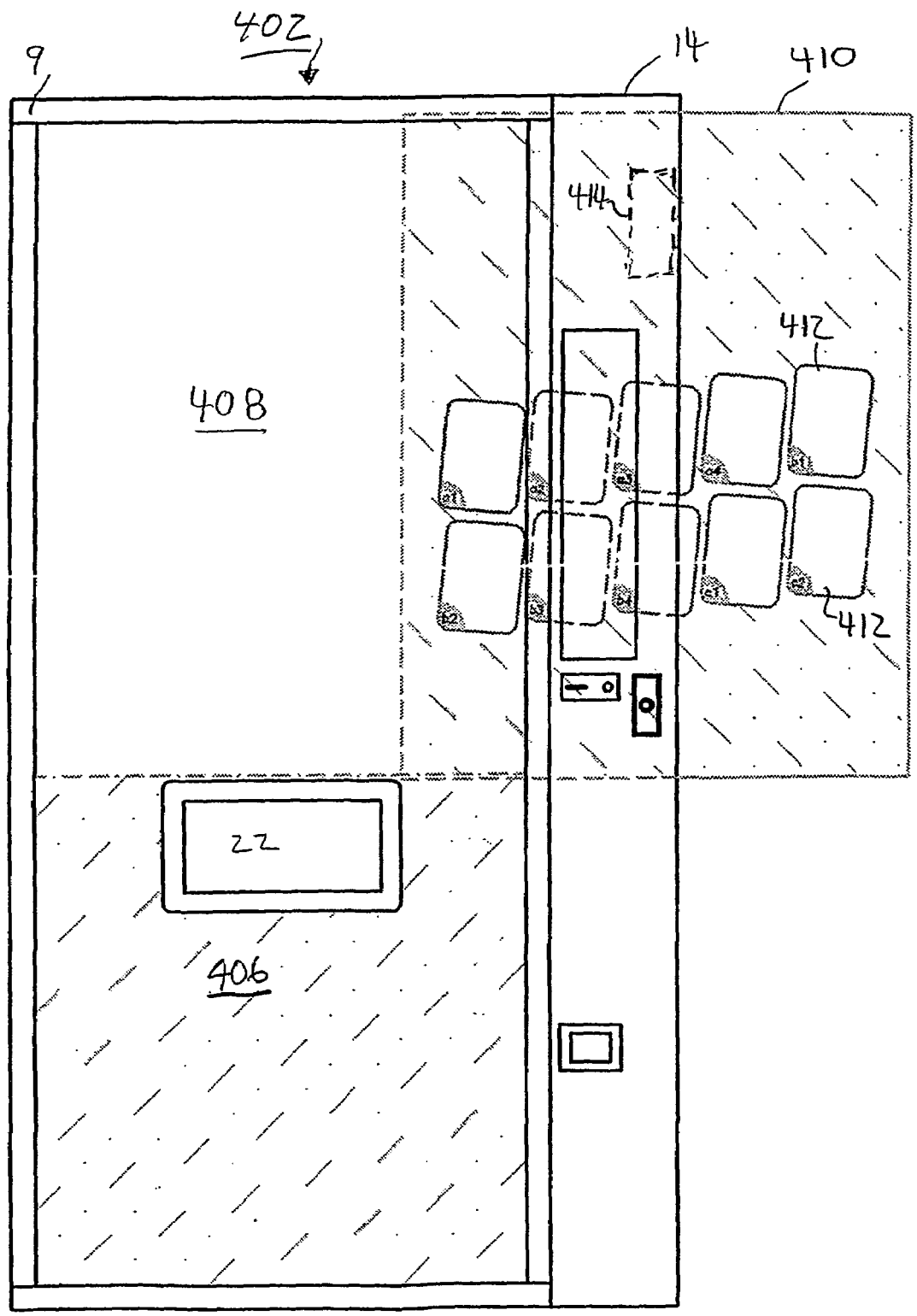
FIGS. 4a and 4b illustrate the cooperation of a replaceable graphics panel with a clear portion of a pre-printed graphics panel mounted to the front door, for enabling customization of the display face of the vending apparatus of FIG. 1 in accordance with the principles of the invention.

In accordance with one aspect of the present invention, bubble front 18, shown as 402 in FIG. 4a, is provided with a first area 406 which may include pre-printed graphics, such as a brand name or other identifying information, and a second portion 408 which has no pre-printed graphics, and therefore is clear/translucent. Portion 408 is therefore adapted for allowing the owner/operator of machine 10 to insert various ones of replaceable graphics panels 410 in juxtaposition therewith for quickly and easily changing the graphics display of the machine. Panel 410 includes multiple product selection graphics 412 thereon, and may also include for/with each graphic 412 and associated product selection indications (e.g., A1, A2, etc.) as well as a price indication. Further details about the construction of panel 410 will be provided in conjunction with FIG. 5. In a further embodiment, upper portion 408 may in fact be positioned anywhere on display panel 402, and can in fact comprise further portions, not shown, in which further replaceable graphics panels 410 can be juxtaposed above, below or to the side of retrieval area 22. In fact, portion 406 of bubble front 18 could also be provided with no graphics, i.e., clear, and a panel similar to graphics panel 410 could also be inserted in the lower portion of bubble front 18.

In accordance with a further aspect of the present invention, replaceable graphics panel 410 is placed in juxtaposition with the interior facing side of panel 402 by the machine operator passing the replaceable graphics display panel 410 from the interior side of door 14, through slot 308, and into a press fit against panel 402. With an arrangement in accordance with the illustrated embodiment, the operator will push panel 410 into slot 308 so that the lower side of panel 410 rests against top portion 23 of customer retrieval area 22, and extends across the expanse of face panel 402 until it reaches stops 320 mounted along the side of frame 9 which is opposed to slot 308. Panel 410 is dimensioned to make a tight fit between the opposed stops 320, so the operator simply pushes panel 410 in as far as it can go, and then presses it against the stops 320 along the edge of slot 308 until it "snaps" into place. Supported in this position panel 410 is visible to a user of the vending machine through the clear portion 408 of bubble front 18. Since slot 308 is only accessible from inside machine 10, unauthorized access to slot 308 and attendant change of the display graphics is substantially prevented. In a further embodiment of the invention, a hinged lockable cover, not shown, may be included over slot 308, for further control over access to slot 308 from inside of machine 10, as well to prevent access to the interior of the machine by vandals located outside of machine 10.

Figure 4B:
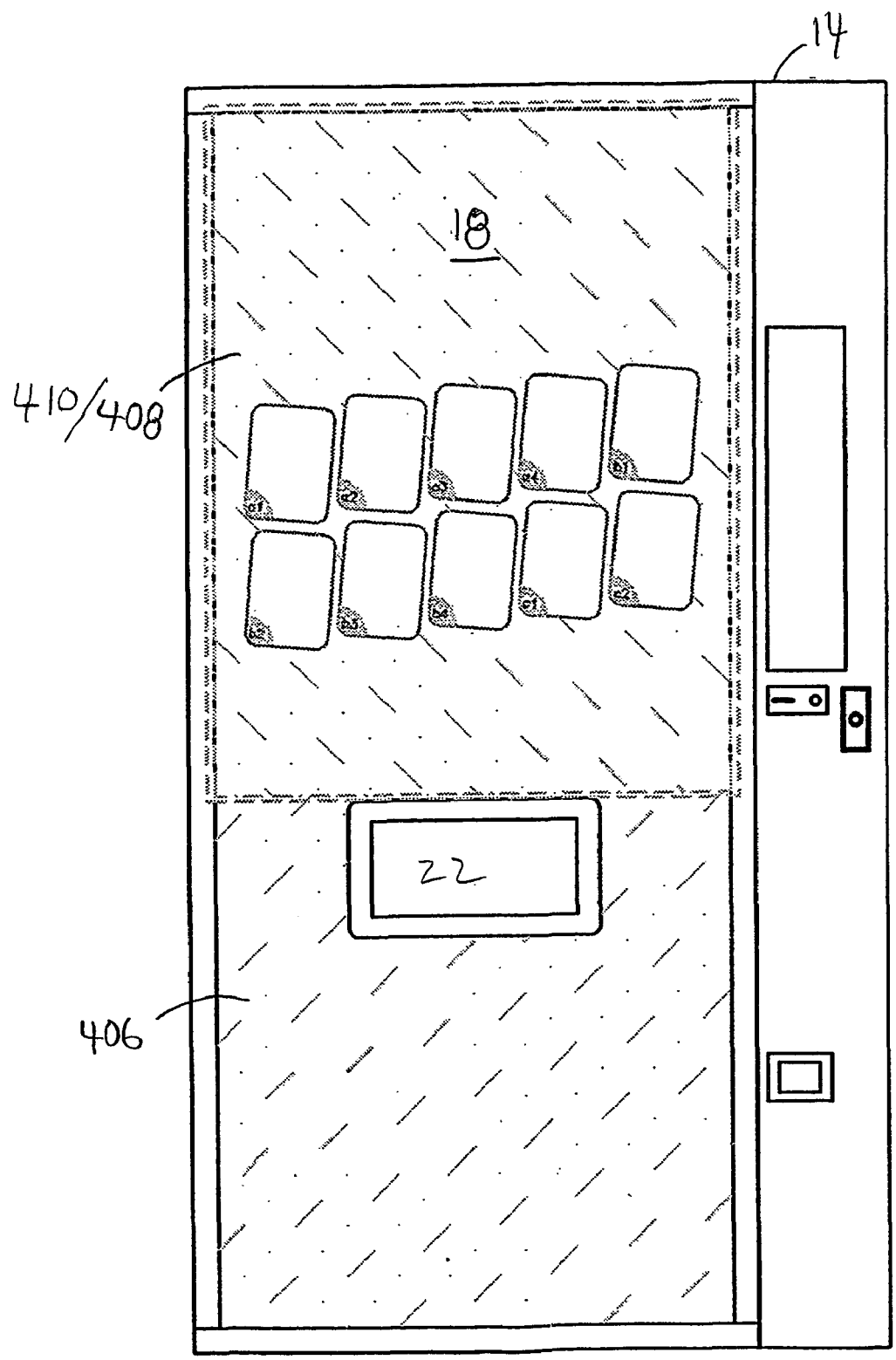

FIG. 4b illustrates a completed assembly of the replaceable graphics panel 410 in juxtaposition with the interior facing side of panel 402, for forming a complete graphics face for machine 10. If desired, panel 410 may have graphics or colored areas which surround graphics 412, and which in fact may make a seamless image with a portion of the graphics on portion 406 of panel 402. Additionally, panel 410 can have a clear, window portion 414 (shown in phantom) which aligns with window 205 of FIG. 2, thereby providing an entrainment opportunity for users of the machine to view its "workings" during the dispensing operation.

To aid with removal of panel 410, one or more of the stops 320 adjacent slot 308 may in fact be hinged so as to cantilever into and out of slot 308, thereby forming a "shoe horn" type of lever which facilitates removal of panel 410 from the tension fit between the opposed stops 320. Alternatively, a shoe horn type lever could be provided on a chain attached near slot 308, so as to always be available for use by the operator. In operation, the operator inserts the lever at an edge of panel 410 near a stop 320, for prying/lifting an edge of panel 410 away from panel 402, so that the edge of panel 410 can then be firmly grasped by the operator for removing panel 410 from its juxtaposition with panel 402 via slot 308.

Clear portion 408 not only provides a location in which one or more of replaceable graphics panels 410 can be juxtaposed, but also allows for the juxtaposed positioning of an associated product selection indication, as well as a price indication. These indications can be included with panel 410 or, in a further embodiment, these indications can be pre-printed on the interior facing side of panel 18, although such an embodiment prevents change of the product selection and price indication unless the panel 18 is replaced.

A top portion of the interior facing portion of front door 14 may include spaced apart hooks 525, shown in FIG. 2, which are used to support the graphics panel 410 before it is inserted into juxtaposition with bubble front 18, so that the operator can view the graphics cards thereon, in order to properly program machine 10 with the corresponding selection number and price for the products displayed by the graphic panel(s), as will be described in greater detail in conjunction with FIG.'s 5. Additionally, while graphics panel 410 is hanging by the hooks 525, the operator may "flip" back the front sheet 510, in order that the holder sheet 516 can be accessed, and the product selection cards 520 thereon can be replaced or re-arranged, if necessary.

The above noted aspects of the present invention allow for a vending machine to be "branded" in that a visibly significant portion of the front graphics would be pre-printed, and therefore indicated to potential users a "main" product offered by the machine. This "branding" aspect of the invention is an incentive for a particular food manufacturer to possibly make a financial contribution to the operator or machine manufacturer, which could be used to offset the purchase price of machine 10. Use of additional graphics panels 410 provides a mechanism for the vending machine operator to display a sub-portion of the vendible products which are not of the same brand or, which are of the same brand but which the operator may want to use to tailor the product selections to the particular use or area where the vending machine is situated.

As note above, the additional graphics panels may also include pre-printed graphics which mates with the pre-printed graphics on panel 18, thereby creating an apparently seamless image across the two graphic areas.

A construction for front panel 18 in accordance with the above description of various embodiments of the invention greatly reduces the cost of panel 18 due to minimization of its pre-printed graphics, which graphics typically change repeatedly over the operational life of machine 10. Accordingly, the present invention provides a reliable and cost effective way to controllably change the graphics display of a merchandiser.

Figure 5A:
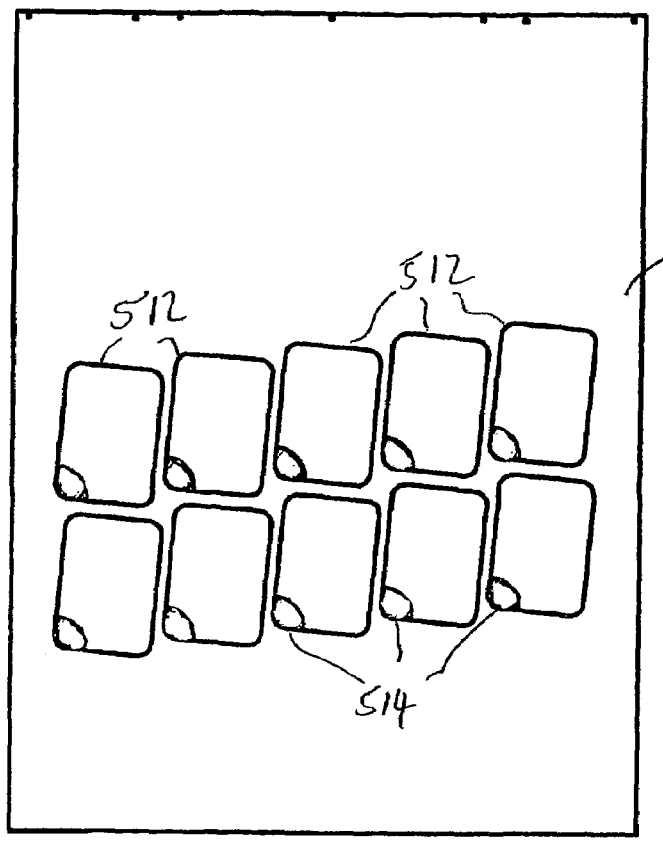
FIGS. 5a, 5b and 5c illustrate the components of one of the embodiment for a replaceable graphics panel constructed and accordance with the principles of the invention.
Figure 5B:
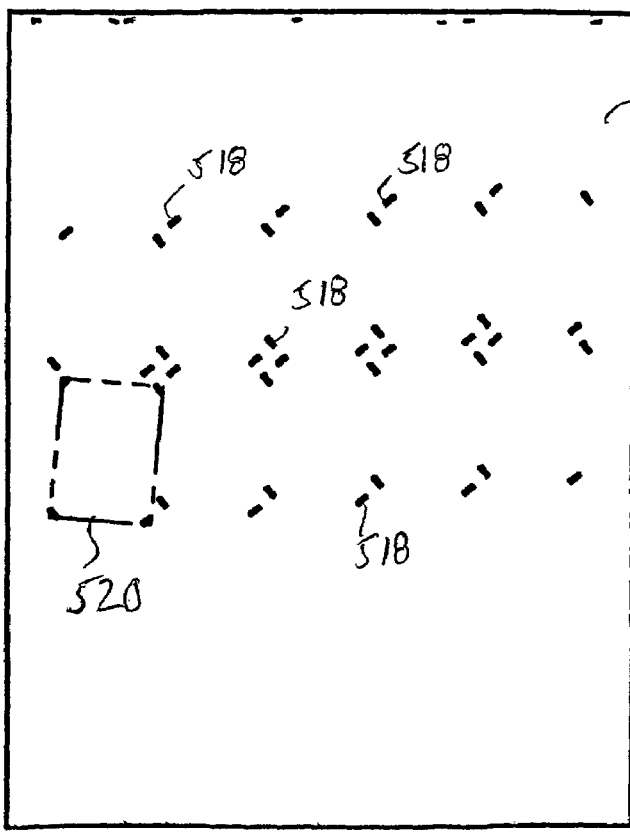
Figure 5C:
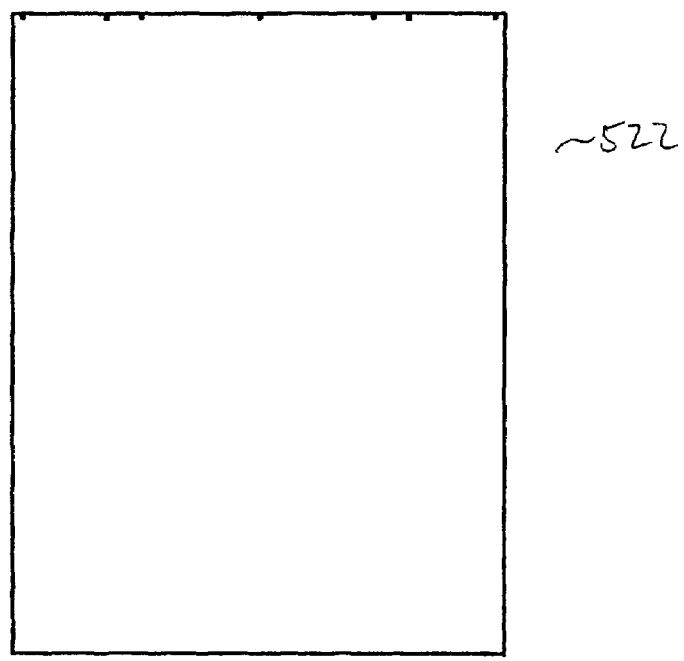

FIGS. 5a, 5b and 5c, illustrate one embodiment of a replaceable graphics panel 410 which is constructed in accordance with the principles of the invention. In this embodiment, replaceable graphics panel 410 comprises a mask sheet 510 comprising a clear sheet having preprinted borders 512 thereon which are dimensioned and positioned on sheet 510 so as to "frame" the individual changeable graphics displays 412. Preprinted borders 512 preferably also include within each border area 512 one or more areas 514 for displaying a product selection indication (e.g. A1, B2, etc.) and possibly a price indication as well. Sheet 510 may also include further graphics thereon, such as a uniform color, background images or "branding" type display or advertising graphics, however the portion of sheet 510 which is within each border 512 is preferably clear. In one embodiment, sheet 510 may comprise a clear flexible polyvinyl material having a thickness of about 0.020 inches. Additionally, the further graphic images of sheet 510 can combine with any of the images of sheets 516, 522 or 18, in order to appear to make a unified, single image.

FIG. 5b illustrates a holder sheet, constructed of a similar material and dimensioned to be the same size as sheet 510, which has an array of slots 518 cut therein. Slots 518 are used to entrapment the corners of a plurality of replaceable graphics cards 520 which are arranged by the operator so that a substantial portion of each replaceable graphics card 520 is on a front word facing side of holder sheet 516, while the corner portions of each replaceable graphics card 520 pass-through a corresponding slot 518 and pass to the reverse side of holder sheet 516. In the illustrated embodiment holder sheet 516 has in an array of slots 518 which are sufficient to hold two rows of replaceable graphics cards 520.

FIG. 5c illustrates a support sheet 522 which is constructed of a similar material and dimensioned to be the same size as sheet 510, however its thickness is substantially greater than sheets 510 and 516, such as twice as thick. The purpose of support sheet 522 is to form a sandwich in conjunction with sheet 510 for holder sheet 516 so as to protect the positioning of the replaceable graphics cards 520 thereon. Additionally, due to the extra thickness of support sheet 522, a completed assembly of sheet 510, 516 and 522 will have sufficient "stiffness" so as to provide the above noted "tension and snap fit" of replaceable graphics panel 410 against the interior side of the bubble front 18. Holes can be provided along the top portion of each of sheets 510, 516 and 522 so that the sheets can be fastened together along their upper edge using, for example, plastic rivets. Additional holes can be provided along the top portion of the completed assembly in order that the completed assembly can be placed on hooks 525 (shown in FIG. 2) which hang from the upper inner edge of door 14, in order that the operator can view the replaceable graphics panel 410 when reprogramming machine 10 to take into account the changes made in the display face by the replaceable graphics panel 410.

In accordance with a further embodiment of the present invention, the replaceable graphics cards 520 could be held onto holder sheet 516 using any of many other conventional holding means, such as a pocket formed by opposing guide rails and a bottom rail that are adhesively attached to the back side of sheet 510. A similar adhesively attached pocket could be used for holding the associated product selection and price indications.

In a further embodiment, replaceable graphics panel 410 could comprise just two sheets of clear plastic material corresponding substantially with sheets 516 and 522. Most of the function of "mask" sheet 510 could be provided by printing the graphics that would have been placed on this sheet, instead on the interior facing side of bubble front 18. Then, for holding the replaceable graphics cards 520, sheet 516 would hold the replaceable graphics cards 520 and possibly their associated selection/price indications on the side of sheet 516 which faces sheet 522, instead of facing bubble front 18. In this manner, the replaceable graphics cards 520 and their associated selection/price indications are sandwiched between sheets 516 and 522. In a further embodiment, appropriately positioned spacers/stops can be sandwiched between sheets 516 and 522 so as to form pockets of a size sufficient for allowing the insertion of the replaceable graphics cards 520 and their associated selection/price indication cards thereunder, through slots formed in sheet 516 near the top of each pocket. The rear of the two sheets should comprise the thicker sheet in order to provide the required stiffness for the completed assembly. Furthermore, instead of using spacers/stops, sheet 516 could just have a slot which is the same width as the replaceable graphics cards 520, and the top portions of the cards could have a width which is slightly greater than the width of the sides. In use, a card placed into the slot will drop down in the space between the two sheets until its wider top stops it from moving down any further, and then holds the card in place. A similar technique can be used for the corresponding price and selection indications.

With a method and apparatus for replaceable graphics in accordance with the principles of the invention, i.e., comprising the graphics introducing slot in combination with the first and second graphic display panels, and also the illustrated embodiments for the multiple sheet assembly which forms the second graphic display panel, each present a particularly advantageous method for controlling changes which represent discrete selections to the display face of a merchandiser so that the changes are only made by authorized personnel. Of particular advantage is the fact that the single replaceable graphic assembly can be prepared/assembled at a location remote from the merchandiser, whereby the replaceable graphic cards can be changed, as well as the associated price tags and selection tags for each graphic illustration of the selection and the relative position on the display face of each graphic card. Furthermore, the preferred embodiment where the replaceable graphics display panel comprises three aligned sheets sandwiched together to form a single replaceable graphic assembly is particularly advantageous because substantially all of the replaceable graphics panels can be made of low-cost plastic, and can be assembled at the remote location without the use of fasteners (by using, e.g., the forenoted press fit techniques), thereby not requiring any tools and facilitating a low-cost assembly. These features introduce a flexibility and a control to the changing the display face portion of the merchandiser which has heretofore been unattainable.

Although the invention has been describe with respect to specific embodiments for making a complete and clear disclosure, the invention described herein is not so limited, and is to be construed as embodying all modification and alternative constructions that may occur to those skilled in the art without undue experimentation, such as the use of other materials and techniques for forming replaceable graphics card 410, fairly fall within the basic teachings set out herein. It is anticipated that various combinations of the described aspects of the invention are suggested hereby, such as use of the described quick change display as a display face without the requirement of having an attached merchandiser. Such a combination or sub-combination, is fully anticipated as falling within the scope of the present invention.

The invention claimed is:

1. A merchandiser (10), comprising:
   a cabinet (12) defining an enclosure including an article storage area (216) and a dispensing arrangement in its interior, said cabinet having a door (14) forming at least one portion of said enclosure, and
   a display portion (14, 18) of said cabinet formed on at least one portion of said door, said display portion including:
      a slot (308) forming a passageway through said door near an edge thereof, and
      an exterior display panel (18) fixedly attached to an exterior side of said door (14) of said cabinet, said exterior display panel (18) including a display area (408) having an edge which overlaps the portion of said door having said slot (308) formed therethrough,
   wherein said slot has a length dimensioned for passing therethrough, from the interior side of said door, a replaceable graphic display panel (410), so as to position the replaceable graphic display panel (410) against an inside facing side of said exterior display panel (18), and wherein said door (14) includes an urging means (9) for securing the replaceable graphic display panel (410) against said display panel (18).

2. The merchandiser of claim 1, wherein said door (14) includes:
   a lock (36) for preventing unauthorized access to the interior of said merchandiser, and
   a cover releaseably secured to the interior side of said door in juxtaposition with said slot (308) so as to block unauthorized entrance to the interior of said cabinet from said exterior.

3. The merchandiser of claim 2, wherein said cover is lockable.

4. The merchandiser of claim 2, wherein
said slot is accessible from the exterior of said cabinet, and
said cover is releaseably secured to the exterior side of said door so as to block unauthorized entrance to the interior of said cabinet from said exterior.

5. The merchandiser of claim 1, wherein
said exterior display panel (18) includes a clear portion (408) thereon, and
said slot (308) is positioned adjacent said clear portion so that a replaceable graphics display panel can be passed therethrough and placed in juxtaposition with said clear portion.

6. The merchandiser of claim 1, wherein said urging means (320) releaseably engages an edge of said replaceable graphic display panel (410) for providing a force to said edge so as to urge said replaceable graphics panel into a tension fit against the inside facing side of said exterior display panel (18).

7. The merchandiser of claim 6, wherein said urging means (320) is arranged along said slot and accessible on the interior side of said door.

8. The merchandiser of claim 7, wherein said urging means (320) is pivotable between a first position during which it receives said edge of said replaceable graphics panel, and a second position during which it provides said urging force.

9. The merchandiser of claim 6, wherein said urging means (320) includes a plurality of spring clips arranged along said slot and a correspondingly plurality of spring clips arranged in an opposed manner at a portion of said display panel 18 which is opposed to said slot, the distance between said opposed spring clips being determined so as to provide to said edges of said replaceable graphics panel said urging force.

10. A display face, comprising:
a first display panel (18) for forming substantially the entire exterior of said display face, at least a portion of said first display panel being clear,
a second display panel (410) including display graphics thereon, said second display panel comprising a first sheet (516) including holding means (518) for releaseably holding at predetermined positions on said first sheet replaceable supplemental graphics cards (520) representative of articles stored in said merchandiser,
urging means (320) for releaseably engaging an edge of said second display panel so as to urge said second display panel into a tension fit against an interior side of said first display panel and aligned with the clear portion (408) of said first display panel.

11. A display face of claim 10, wherein:
said display face forms an exterior display portion of an automatic merchandiser, and
said second display panel (410) includes display graphics thereon representative of articles stored in said merchandiser.

12. The display face of claim 10, wherein the clear portion of said first display panel comprises substantially the entire display face for said article merchandiser.

13. The display face of claim 10, wherein the clear portion of said first display panel comprises a sub-portion of the display face for said merchandiser.

14. The display face of claim 10, wherein said first sheet also includes holding means for holding a further graphics card representative of one of a selection identification or a price far a particular article stored in said merchandiser.

15. The display face of claim 10, wherein said second display panel (410) includes a second sheet (510) having substantially the same shape as said first sheet and includes preprinted graphics (510, 514) positioned thereon, so as to supplement the cards held on said first sheet when said first and second sheets are positioned one on top of another.

16. The display face of claim 15, wherein said preprinted graphics of said second sheet comprise one or more of:
a border (512),
a unique selection identifier (514), and
a price (514)
for a replaceable graphic card (520) of said first sheet (516) representative of a particular article stored in said merchandiser.

17. The display face of claim 10, wherein holding means of said first sheet (516) comprises slots (518) formed in said first sheet.

18. The display face of claim 17, wherein the slots in said first sheet are positioned to receive corners of said cards (520) so as to hold said cards at a predetermined position thereon.

19. The display face of claim 17, wherein the slots in said first sheet (516) are positioned to receive the width portion of said cards so as to hold said cards at a predetermined position thereon.

20. The display face of claim 17, further including a tension sheet (522) having substantially the same shape as said first sheet, for being positioned on one side of said first sheet so as to protect said cards from movement with respect to said first sheet and to act as a stiffener to the assembly of said first, second and tension sheets of the second display panel (410).

21. The display face of claim 17, further including a second sheet having substantially the same shape as said first sheet, said first sheet including preprinted graphics positioned thereon and for being positioned on an other side of said first sheet, so as to supplement the cards held on said first sheet when said first and second sheets are positioned one on top of another.

22. The display face of claim 21, wherein means (rivets) are provided for securing said first, second and tension sheets together.

23. The display face of claim 22, wherein said means for securing comprises tab portions on one of said first and tension sheets which releasably engage receiving portions in the other of said first and tension sheets which are aligned with said tab portions.

24. The display face of claim 23, wherein said tab portions releasably engage said receiving portions using a friction-fit.

25. A method for controlling the display face of the merchandiser, comprising the following steps:
providing a merchandiser having mounted on an exterior side thereon in a substantially permanent maimer, a first display panel (18) for Conning an exterior portion of said display face, at least a portion (408) of said first display panel being clear,
providing a replaceable second display panel (410) which includes display graphic cards (520) thereon representative of articles stored in said merchandiser, said second display panel comprising a first sheet (516) including holding means (518) for replaceably bolding at predetermined positions on said first sheet replaceable supplemental graphics cards (520), said second display panel being dimensioned so as to align with the clear portion of said first display panel, and
releaseably engaging opposed edges of said second display panel so as to urge said second display panel into a tension fit against an interior side of said first display panel and aligned with the clear portion (408) of said first display panel, so as to form a display face in which said display graphics (520) are visible to a user of the merchandiser.

26. The method of claim 25, wherein the merchandiser includes a cabinet having a display portion including a slot therein near an edge thereof, wherein said providing step comprises:

passing said second panel through said slot, from the interior side of the display portion to an exterior side of said display portion, so as to position said second panel in juxtaposition with the clear area of said first display panel.

27. The method of claim 25, wherein said step of providing a replaceable second display panel comprises:

providing as said second display panel a first flexible sheet (510) and a second flexible sheet (516), said first flexible sheet (510) having preprinted graphics thereon representative of one or more of a border, a unique selection identifier, or a price, for a replaceable graphic card (520) representative of a particular article stored in said merchandiser, and said second flexible sheet (516) being in juxtaposition with said first flexible sheet and holding said replaceable graphics cards.

28. The method of claim 27, including a further step of:

providing a third flexible sheet (522) so as to sandwich said second flexible sheet between said first and third flexible sheets.

29. A display face for forming a convexly curved exterior display portion of an automatic merchandiser, said display face comprising:

a first display panel (18) for forming a convexly curved portion of the exterior of said display face, at least a sub-portion of said first display panel being clear, a second display panel (410) including display graphics thereon, and urging means (320) for releaseably engaging an edge of said second display panel so as to urge said replaceable graphics panel into a tension fit against an interior side of said first display panel, with the display graphics of the second display panel (410) being aligned with the clear portion (408) of said first display panel, wherein said second display panel comprises: a first sheet (510) having preprinted graphics (510, 514) positioned thereon, the first sheet (510) being aligned in its tension fit wit the first display panel so that at least some of the preprinted graphics of the first sheet are visible through the clear portion of the firs display panel, and a second sheet (516) including holding means for holding replaceable supplemental graphics cards (520) representative of articles stored in said merchandiser, the second sheet (516) also being aligned in its tension fit with the first display panel so as to supplement the preprinted graphics on said first sheet when viewed through the clear portion of said first display panel.

30. The display face of claim 29, wherein said second sheet (516) holds said cards (520) thereon using slots (518) formed in said second sheet.

31. The display face of claim 30, wherein the slots in said second sheet are positioned to receive corners of said cards (520) so as to hold said cards at a predetermined position thereon.

32. The display face of claim 30, wherein the slots in said second sheet (516) are positioned to receive the width portion of said cards so as to hold said cards at a predetermined position thereon.

33. The display face of claim 29, further including a tension sheet (522) having a size at least as large as said second sheet, for being positioned on a side of said second sheet which is opposite said first display panel, so as to protect said cards from movement with respect to said second sheet and to act as a stiffener to an assembly of said first, second and tension sheets of the second display panel (410).

* * * * *